US012374817B2

(12) United States Patent
Kwon et al.

(10) Patent No.: US 12,374,817 B2
(45) Date of Patent: Jul. 29, 2025

(54) CONNECTOR AND CABLE ASSEMBLY COMPRISING THE SAME

(71) Applicant: Tyco Electronics AMP Korea Co., Ltd., Gyeongsan (KR)

(72) Inventors: Gi-Chan Kwon, Gyeongsan-Si (KR); Seung Moon Ryu, Gyeongsan-Si (KR)

(73) Assignee: Tyco Electronics AMP Korea Co., Ltd., Gyeongsan (KR)

( * ) Notice: Subject to any disclaimer, the term of this patent is extended or adjusted under 35 U.S.C. 154(b) by 951 days.

(21) Appl. No.: 17/467,984

(22) Filed: Sep. 7, 2021

(65) Prior Publication Data

US 2022/0077615 A1 Mar. 10, 2022

(30) Foreign Application Priority Data

Sep. 7, 2020 (KR) ........................ 10-2020-0113948
Jul. 22, 2021 (KR) ........................ 10-2021-0096522

(51) Int. Cl.
*H01R 13/00* (2006.01)
*H01R 13/02* (2006.01)
*H01R 13/627* (2006.01)
*H01R 13/6592* (2011.01)

(52) U.S. Cl.
CPC ....... *H01R 13/025* (2013.01); *H01R 13/6273* (2013.01); *H01R 13/6592* (2013.01)

(58) Field of Classification Search
CPC .............. H01R 13/025; H01R 13/6273; H01R 13/6592
See application file for complete search history.

(56) References Cited

U.S. PATENT DOCUMENTS 3,748,634 A 7/1973 Barnes et al.
7,458,851 B2 * 12/2008 Montena .............. H01R 9/0521 439/584
7,942,695 B1 5/2011 Lu
2003/0224656 A1 12/2003 Yoshida
2019/0199013 A1 6/2019 Kanemura et al.

FOREIGN PATENT DOCUMENTS

DE 10315042 A1 10/2003
DE 10148602 A1 8/2022

OTHER PUBLICATIONS

Extended European Search Report, Application No. 21194727.0-1201, Dated: Jan. 31, 2022, 10 pages.

* cited by examiner

*Primary Examiner* — Phuong Chi Thi Nguyen
(74) *Attorney, Agent, or Firm* — Barley Snyder

(57) ABSTRACT

A connector for connecting to a cable having a conducting wire includes an outer shield adapted to receive the cable. A holder is mounted within the shield and receives a center contact of the connector. The center contact receives and electrically contacts the conducting wire, with at least a portion of the center contact being elastically deformed by the conducting wire as it is inserted into the center contact.

19 Claims, 9 Drawing Sheets

CONNECTOR AND CABLE ASSEMBLY COMPRISING THE SAME

CROSS-REFERENCE TO RELATED APPLICATIONS

This application claims the priority benefit of Korean Patent Application No. 10-2020-0113948 filed on Sep. 7, 2020, and Korean Patent Application No. 10-2021-0096522 filed on Jul. 22, 2021, in the Korean Intellectual Property Office, the disclosures of which are incorporated herein by reference for all purposes.

FIELD OF THE INVENTION

The present invention relates to electrical connectors and cable assemblies including the same, and more specifically, to electrical connectors for use with coaxial cables.

BACKGROUND

A connector is a type of component that allows or blocks an electrical connection. Connectors are used in various electromechanical devices such as automobiles or home appliances to enable an electrical and/or physical connection between a plurality of electronic components. Similarly, a cable assembly typically includes a connector and a cable that are connected to each other. The cable may move in a longitudinal direction of the connector and be inserted into the connector. In the case of a coaxial cable and an associated connector, while the cable is inserted into the connector during assembly, a conducting wire of the cable and a center contact of the connector must be physically and electrically connected to each other. This process can be time consuming, costly and/or unreliable.

Accordingly, there is a need for improved solutions for achieving a stable connection between a conducting wire of a cable and a center contact of a connector while facilitating the insertion of the cable into the connector.

SUMMARY

According to an embodiment of the present disclosure a connector for connecting to a cable having a conducting wire is provided. The connector includes an outer shield, a holder and a center contact. The holder is arranged within the shield and receives the center contact therein. adapted to receive the cable. The center contact receives and electrically contacts the conducting wire, with at least a portion of the center contact being elastically deformed by the conducting wire as it is inserted into the center contact.

BRIEF DESCRIPTION OF THE DRAWINGS

The invention will now be described by way of example with reference to the accompanying Figures, of which.

DETAILED DESCRIPTION OF THE EMBODIMENTS

Figure 1:
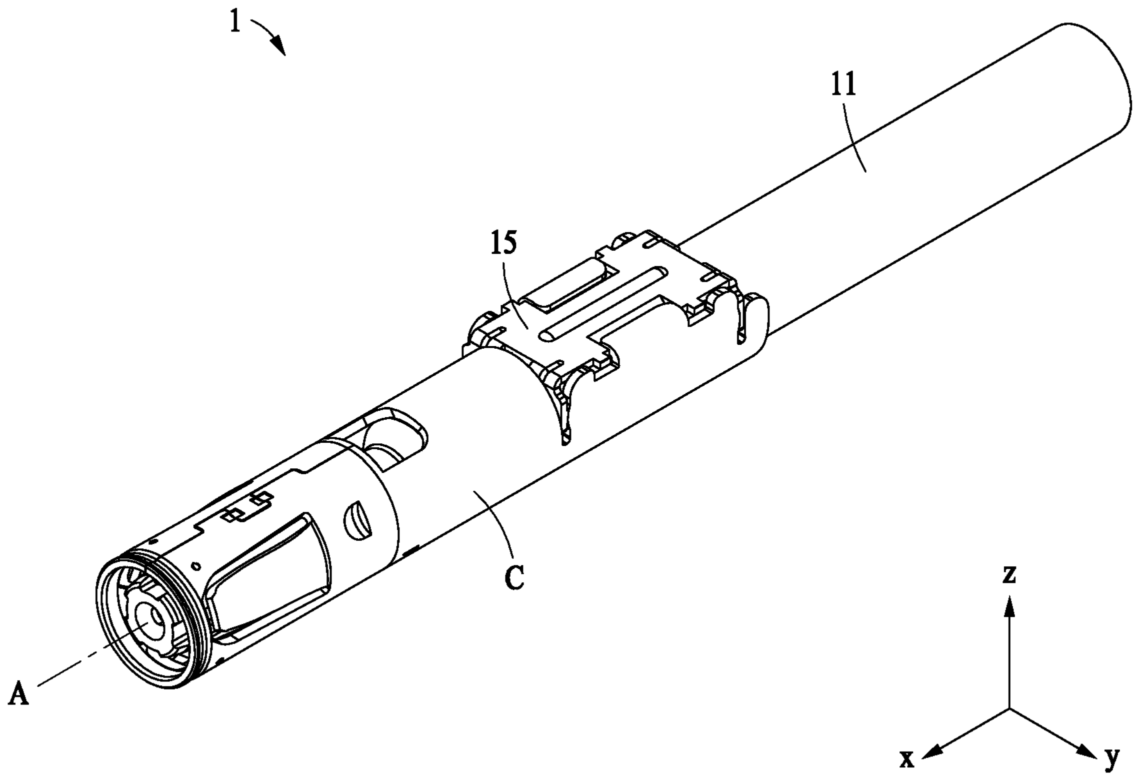
FIG. 1 is a perspective view illustrating a cable assembly according to an example embodiment.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
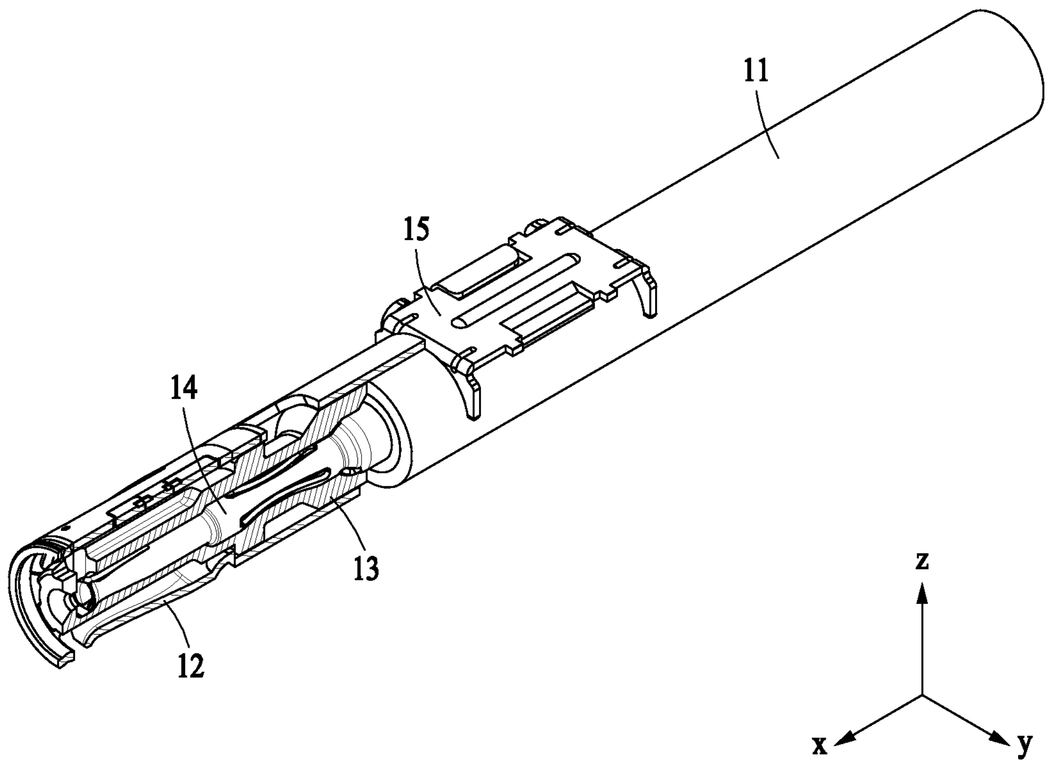
FIG. 2 is a perspective view with a partial cross-section illustrating a cable assembly according to an example embodiment.
Figure 3:
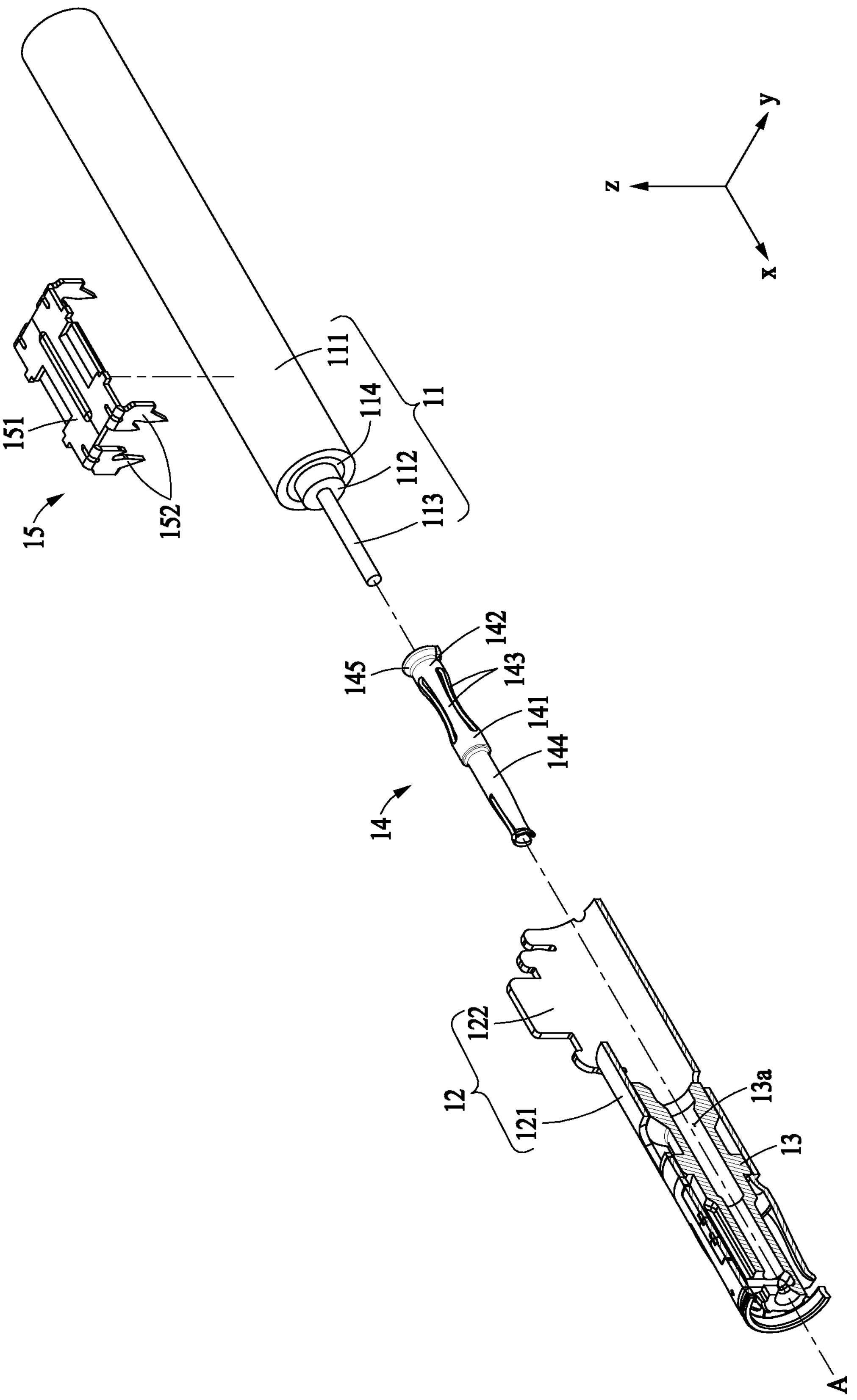
FIG. 3 is an exploded perspective view illustrating a cable assembly according to an example embodiment.
Figure 4:
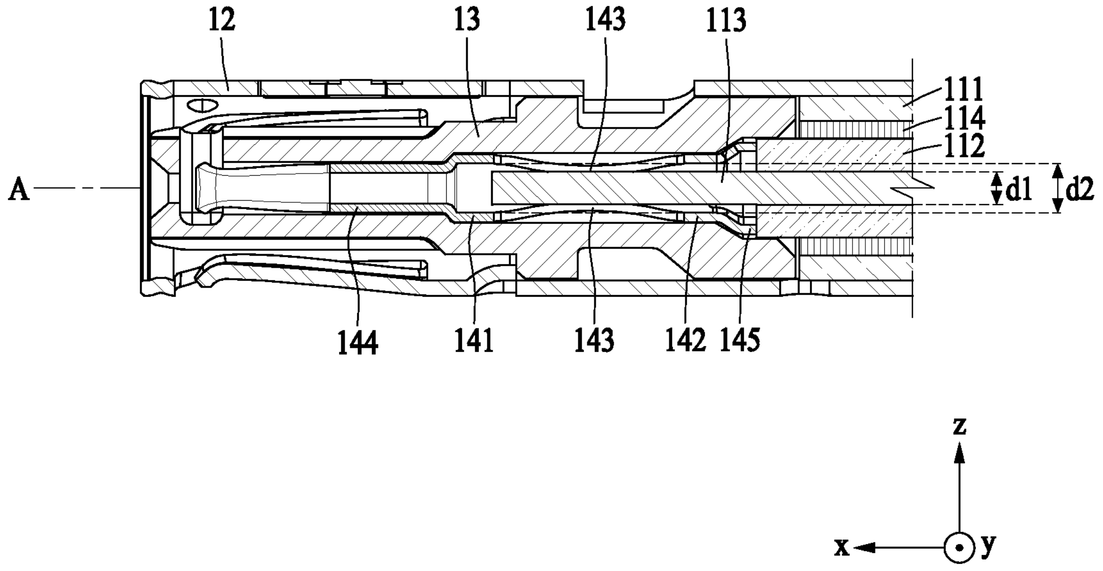
FIG. 4 is a cross-sectional view illustrating a cable assembly according to an example embodiment.

FIG. 1 is a perspective view illustrating a cable assembly according to an example embodiment, FIG. 2 is a perspective view with a partial cross-section illustrating the cable assembly according to an example embodiment, FIG. 3 is an exploded perspective view illustrating the cable assembly according to an example embodiment, and FIG. 4 is a cross-sectional view illustrating the cable assembly according to an example embodiment.

Referring to FIGS. 1-4, a cable assembly 1 according to an embodiment of the present disclosure enables a simplified assembly process. The cable assembly 1 may include a connector C and a cable 11, and a cover 15 for fastening the connector C and the cable 11 in a state in which the connector C and the cable 11 are electrically connected to each other. The cable assembly 1 may be completely assembled through a process of inserting the cable 11 into the connector C, seating the cover 15 on the cable 11, and physically fastening the connector C and the cover 15 by deforming the connector C. Unlike prior art solutions, the connector assembly 1 does not require a separate process for physically fastening a conducting wire of the cable 11 and a center contact of the connector C. In the case of the connector assembly 1, during the process of inserting the cable 11 into the connector C, the physical connection between the conducting wire of the cable 11 and the center contact of the connector C may be performed at the same time.

In the exemplary embodiment, the cable 11 and the connector C may be coaxially connected to each other. The direction in which the cable 11 is inserted into the connector C is the +x direction, and will be referred to as "forward" herein. On the other hand, the −x direction, which is opposite to the direction in which the cable 11 is inserted into the connector C, will be referred to as "backward". A central axis A of the connector C may be formed in the x-axial direction, and pass through the conducting wire of the cable 11.

The cable 11 may be inserted into and mounted on the connector C. A user may fasten the cable 11 and the connector C through the cover 15 and at the same time perform a shielding function, while the cable 11 is inserted into the connector C. The cable 11 may include a cover layer 111, a conducting wire support 112 covered by the cover layer, a conducting wire 113 supported by the conducting wire support, and a metal shell 114 provided between the cover layer and the conducting wire support.

The connector C may support the cable 11 and includes a shield 12 forming the external surface of the connector, a holder 13 provided inside the shield and supported by the shield, and a center contact 14 supported by the holder. The holder 13 may be mounted inside the shield 12 and support the center contact 14. The holder 13 may be fixed to an inner wall of the shield 12. The holder 13 may have a hollow interior opening 13_a_ for receiving the center contact 14 therein.

The cover layer 111 may protect the conducting wire 113 and the conducting wire support 112. The conducting wire support 112 may have a larger diameter than the conducting wire 113, and be held by the holder 13. The conducting wire support 112 may determine an insertion distance of the conducting wire 113 with respect to the center contact 14. The conducting wire support 112 may include an insulating material. The conducting wire 113 may be inserted into the center contact 14. The metal shell 114 may be connected to the cover 15, as described herein, to electrically serve as a ground.

The state of the shield 12 may be changed from an initial state to a compressed state by an external force. When the shield 12 is in the initial state, the cable 11 may be freely moveable within the inner space of the shield 12. When the cable 11 is completely inserted into the shield 12, the user may seat the cover 15 on the cable and then fix the cover by deforming the shield. The shield 12 may include a shield body 121 for receiving the holder 13, and a shield arm 122 extending from the shield body for being deformed by an external force to support or retain the cover 15. In the exemplary embodiment, a pair of shield arms 122 may be provided.

The center contact 14 may have a structure that is to be in contact with the outer surface of the conducting wire 113 while the conducting wire is inserted into the center contact 14 in the x-axial direction. According to this structure, while the cable 11 is inserted into the connector C, the physical connection between the conducting wire 113 and the center contact 14 may be automatically implemented. In other words, the connector assembly 1 does not require a separate process for implementing the physical connection between the conducting wire 113 and the center contact 14. The center contact 14 may include a plurality of contact points to be in contact with the conducting wire 113. The contact points refer to portions of the center contact 14 that are in contact with the conducting wire 113. The number of contact points may be equal to the number of contact arms, as set forth herein.

A front body 141 of the center contact 14 may be held by the holder 13. The front body 141 may set a distance by which the center contact 14 is inserted into the holder 13. The front body 141 may have a pillar shape having a space therein. A rear body 142 of the center contact 14 may be provided at a position apart from the front body 141 backward, that is, in the −x direction. A diameter d1 of the conducting wire 113 may be smaller than a diameter d2 of each of the front body 141 and the rear body 142. The front body 141 and the rear body 142 may be spaced apart from the conducting wire 113.

A plurality of contact arms 143 may connect the front body 141 and the rear body 142. The plurality of contact arms 143 may have a shape that is convex toward the conducting wire 113. For example, a contact arm positioned in the +z direction with respect to the conducting wire 113 may have a shape that is convex in the −z direction. The plurality of contact arms 143 may have a shape that is convex in a direction toward the central axis A of the connector C. The plurality of contact arms 143 may have a shape that is convex in a direction away from the inner surface of the holder 13. The plurality of contact arms 143 may be in contact with the conducting wire 113.

The plurality of contact arms 143 may be elastically deformed outward by the conducting wire 113 while the conducting wire is inserted into the center contact 14. In response to the elastic deformation, a restoring force may act to bring the plurality of contact arms 143 to close contact with the conducting wire 113. For example, a contact arm positioned in the +z direction with respect to the conducting wire 113 may be elastically deformed in the +z direction by the conducting wire 113, and the restoring force may act in the −z direction such that the stable connection between the contact arm and the conducting wires 113 may be maintained.

The plurality of contact arms 143 may be arranged at equal intervals in the circumferential direction about the central axis A of the connector C. For example, two contact arms may be arranged at 180-degree intervals, three contact arms may be arranged at 120-degree intervals, four contact arms may be arranged at 90-degree intervals, and six contact arms may be arranged at 60-degree intervals. According to this structure, a resultant force of the forces applied from the plurality of contact arms 143 to the conducting wire 113 may be substantially approximate to "0", and the conducting wire may be maintained at a position parallel to the central axis A of the connector C. For example, when the number of the plurality of contact arms 143 is even, at least two of the plurality of contact arms may be positioned opposite to each other based on the conducting wire 113. The direction of the force applied by one of the two contact arms to the conducting wire 113 may be opposite to the direction of the force applied by the other contact arm to the conducting wire.

A contact head 144 of the center contact 14 may extend forward from the front body 141. The contact head 144 may have a shape to be connected to another connector. For example, the contact head 144 may have a shape of a receptor for receiving a rod formed in a center contact of the other connector. The contact head 144 may alternatively have a shape of an elongated rod. The contact head 144 may have a diameter smaller than that of the front body 141. According to this structure, a step may be formed between the contact head 144 and the front body 141, and the step may be held by the holder 13.

A contact base 145 of the center contact 14 may extend backward from the rear body 142. The contact base 145 may have a shape that is wider toward the rear. According to this shape, when the conducting wire 113 enters the center contact 14 while not being aligned therewith, the contact base 145 may guide the conducting wire 113 into the rear body 142.

The cover 15 may be fixed by the shield 12 while being placed on the upper side of the cable 11. The cover 15 may include a cover body 151 seated on the cover layer 111, and cover projections or sharpened tines 152 extending from the cover body and penetrating through the cover layer and connecting to the metal shell 114. The cover 15 may be physically fixed to the upper side of the cover layer 111, thereby not only serving to fix the cover layer so as not to move in the axial direction, but also electrically serving as a ground. For example, the cover 15 may block the intrusion of external noise into the conducting wire 113, or block the external leakage of a signal of the conducting wire.

Figure 5:
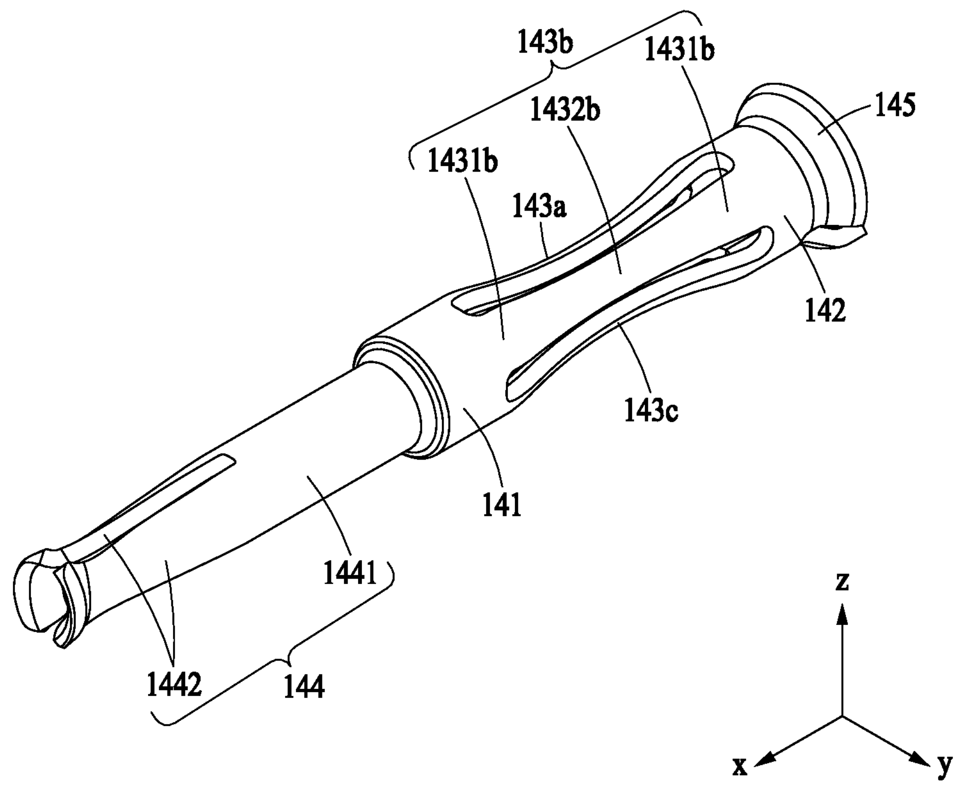
FIG. 5 is a perspective view illustrating a center contact according to an example embodiment.
Figure 6:
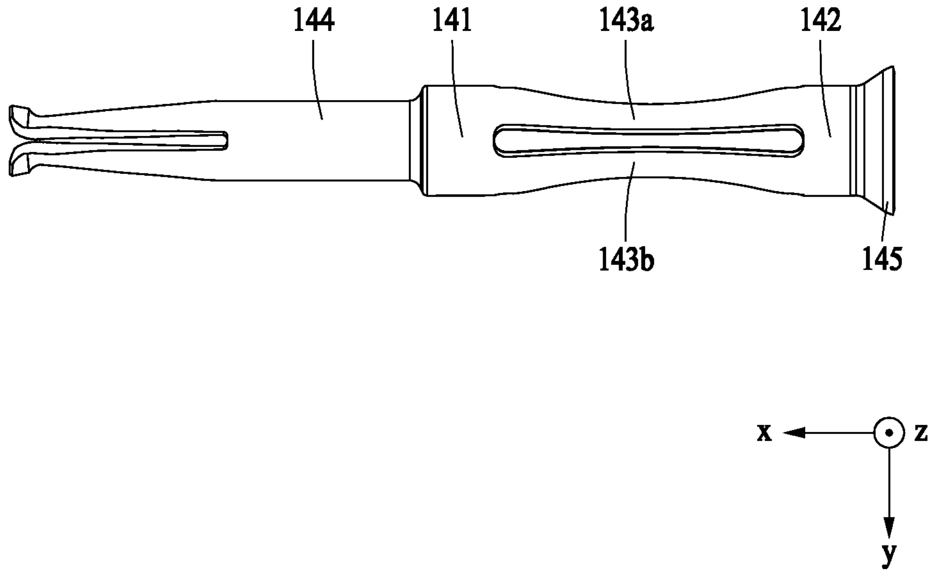
FIG. 6 is a plan view illustrating a center contact according to an example embodiment.
Figure 7:
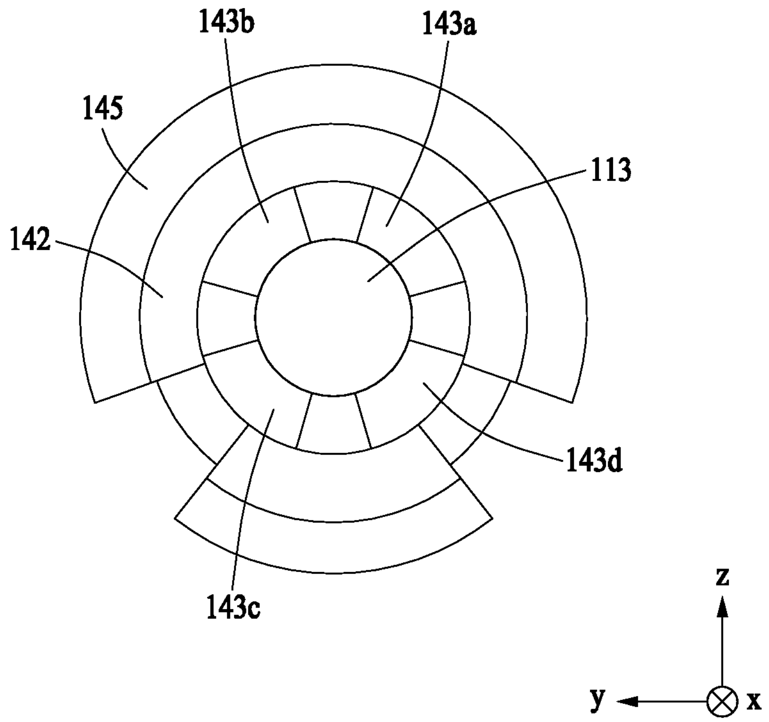
FIG. 7 is a rear view illustrating a center contact according to an example embodiment.

FIG. 5 is a perspective view illustrating a center contact according to an example embodiment, FIG. 6 is a plan view illustrating the center contact according to an example embodiment, and FIG. 7 is a rear view illustrating the center contact according to an example embodiment.

Referring to FIGS. 5-7, a center contact may include the front body 141, the rear body 142, a plurality of contact arms 143*a*, 143*b*, 143*c*, and 143*d*, the contact head 144, and the contact base 145. The plurality of contact arms 143*a*, 143*b*, 143*c*, and 143*d* may be arranged at equal intervals in the circumferential direction. For example, the first contact arm 143*a*, the second contact arm 143*b*, the third contact arm 143*c*, and the fourth contact arm 143*d* may be arranged counterclockwise at equal intervals about the x-axis.

Hereinafter, the description of the contact arms will be provided based on the second contact arm 143*b*. The contact arm 143*b* may include an arm body 1432*b* having a shape that is convex toward the conducting wire 113 (see FIG. 4), and an arm head 1431*b* connecting the arm body 1432*b* to at least one of the front body 141 and the rear body 142. The figures show an example of providing a pair of arm heads 1431*b* connecting the arm body 1432*b* to both the front body 141 and the rear body 142. However, embodiments according to this disclosure are not limited thereto. For example, a single arm head 1431*b* may be provided to connect the arm body 1432*b* to the front body 141 or the rear body 142.

The arm body 1432*b* may have, toward the rear, a shape that is more spaced apart from the central axis A (see FIG. 4) of the connector. According to this shape, when the conducting wire 113 is in contact with the arm body 1432*b*, the surface of the arm body 1432*b* that is in contact with the conducting wire 113 may have, toward the rear, a shape that is inclined upward, such that the arm body 1432*b* may not interfere with the insertion of the conducting wire 113.

For example, the arm head 1431*b* may have a shape that is wider from the arm body 1432*b* toward the front body 141 or the rear body 142. The thickness of a portion of the arm head 1431*b* connected to the front body 141 or the rear body 142 may be greater than the thickness of a portion of the arm head 1431*b* connected to the arm body 1432*b*. As used herein, the "thickness" refers to a length measured in the circumferential direction based on the central axis of the connector C. According to this shape, the area of a portion that is deformed relatively greatly may be large, and thus the durability of the contact arm may be improved.

The contact head 144 may include a contact head body 1441 extending from the front body 141, and a pair of head arms 1442 connected to the contact head body 1441. The pair of head arms 1442 may receive a rod (not shown) of another connector.

Figure 8:
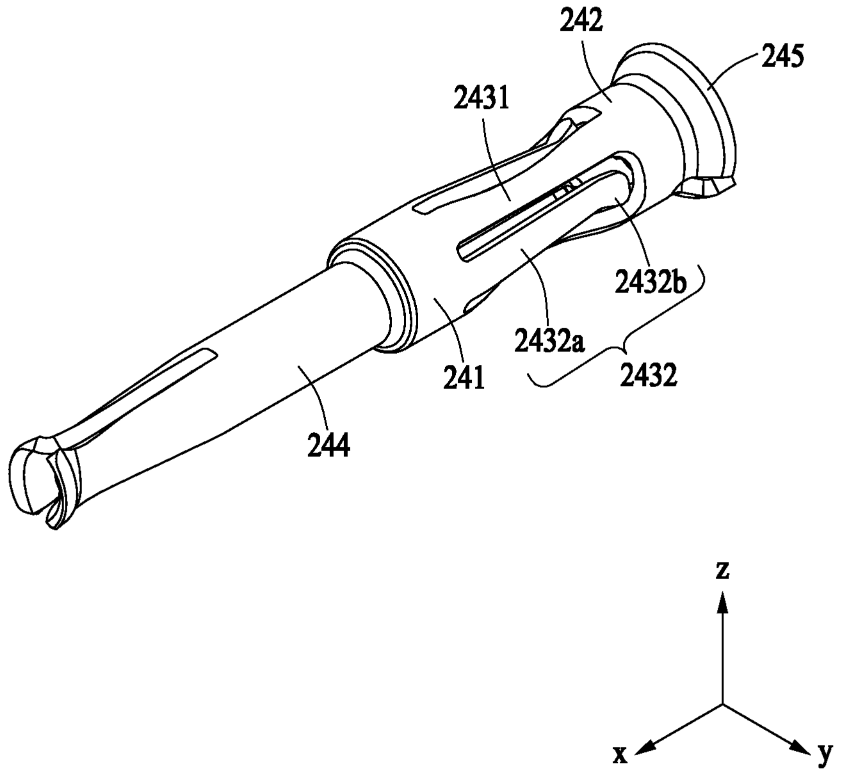
FIG. 8 is a perspective view illustrating a sensor contact according to an example embodiment.
Figure 9:
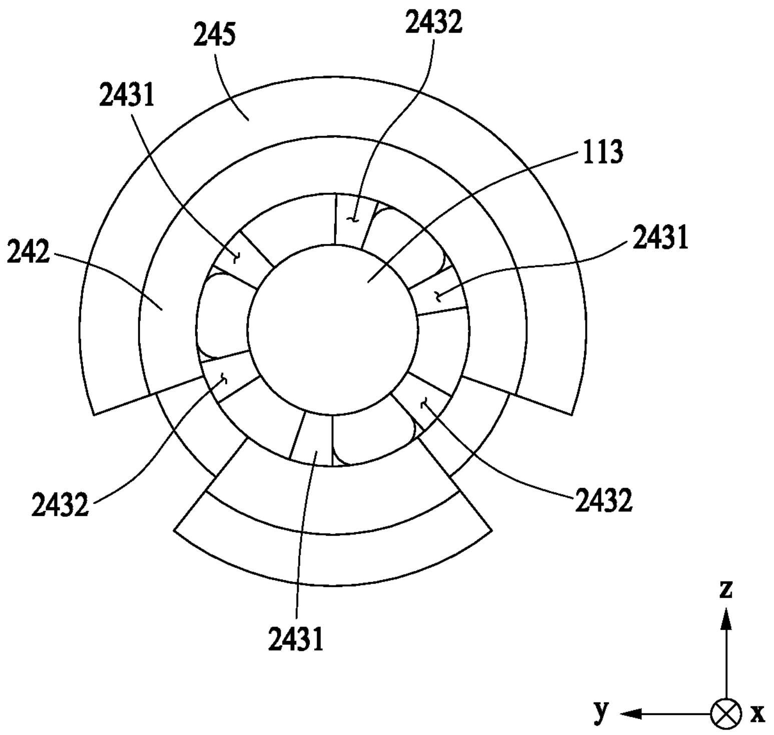
FIG. 9 is a rear view illustrating a sensor contact according to an example embodiment.

FIG. 8 is a perspective view illustrating a sensor contact according to an example embodiment, and FIG. 9 is a rear view illustrating the sensor contact according to an example embodiment.

Referring to FIGS. 8 and 9, another center contact may include a front body 241, a rear body 242, a plurality of contact arms 2431 and 2432, a contact head 244, and a contact base 245.

One of the plurality of contact arms 2431 and 2432, for example, the contact arm 2431, may have a shape in which both ends are connected to the front body 241 and the rear body 242, respectively. Meanwhile, the other of the plurality of contact arms 2431 and 2432, for example, the contact arm 2432, may have a shape in which one end thereof is connected to the front body 241 and a rear end thereof is spaced apart from the rear body 242 (i.e., may comprise a cantilevered arm).

The contact arm 2432 (and/or the contact arm 2431) may include an arm body 2432*b* to be in contact with the conducting wire 113 (see FIG. 4), and an arm head 2432*a* connecting the arm body 2432*b* and the front body 241. The arm body 2432*b* may have, toward the rear, a shape that is more spaced apart from the central axis A (see FIG. 4) of the connector C.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector for connecting to a cable having a conducting wire, the connector comprising:
- a shield for receiving the cable;
- a holder mounted on the shield; and
- a center contact arranged within the holder, at least a portion of the center contact being elastically deformed by the conducting wire as the conducting wire is inserted into the center contact, the center contact including:
  - a front body and a rear body disposed inside the holder and spaced apart from the conducting wire; and
  - a plurality of contact arms arranged between the front body and the rear body and having a shape that is convex toward the conducting wire so as to be electrically contacted by, and elastically deformed in a radially outward direction relative to a central axis of the connector, by the conducting wire.

2. The connector of claim 1, wherein the plurality of contact arms are spaced apart from each other in a circumferential direction about the central axis of the connector.

3. The connector of claim 1, wherein the center contact further comprises a contact head extending forward from the front body and having a diameter less than a diameter of the front body.

4. The connector of claim 1, wherein the center contact further comprises a contact base extending rearward from the rear body and having a shape that is wider toward the rear.

5. The connector of claim 1, wherein each of the plurality of contact arms comprises:

an arm body for contacting the conducting wire and having a shape that is spaced further apart from the central axis of the connector at the rear body and spaced closer to the central axis in a direction toward the front body; and an arm head connecting the arm body to at least one of the front body or the rear body.

6. The connector of claim 5, wherein the arm head includes a pair of arm heads, one arm head of the pair of arm heads connecting the front body to the arm body, and the other arm head of the pair of arm heads connecting the rear body to the arm body.

7. The connector of claim 5, wherein an arm body of at least a portion of the plurality of contact arms is spaced apart and detached from the rear body.

8. The connector of claim 1, further comprising a cover adapted to be fixed to the shield, the cover including at least one projection for engaging with the cable for fixing the cover relative to the cable.

9. The connector of claim 8, wherein the shield includes at least one shield arm adapted to be deformed by an external force for fixing the cover to the shield.

10. The connector of claim 8, wherein the protection includes a plurality of sharpened tines for penetrating an outer cover of the cable.

11. A cable assembly comprising:

a cable including:

a conducting wire;

a conducting wire support enclosing the conducting wire;

a metal shell enclosing the conducting wire support; and a cover layer enclosing the metal shell;

a connector including:

a shield; and a center contact provided inside the shield and receiving the conducting wire therein, at least a portion of the center contact applying a contact force on the conducting wire; and a cover including:

a cover body seated on the cover layer and fixed by the shield; and a cover projection extending from the cover body and passing through the cover layer to be connected to the metal shell.

12. The cable assembly of claim 11, wherein the conducting wire elastically deforms the portion of the center contact generating the contact force.

13. The cable assembly of claim 11, wherein the connector further includes a holder mounted on the shield, the center contact arranged within the holder.

14. The cable assembly of claim 13, wherein the shield includes:

a shield body configured to receive the holder; and a shield arm extending from the shield body and adapted to be deformed by an external force to support the cover.

15. The cable assembly of claim 11, wherein the center contact includes a plurality of radially-arranged contact points for contacting the conducting wire.

16. The cable assembly of claim 15, wherein the center contact comprises:

a front body and a rear body disposed inside the shield and spaced apart from the conducting wire; and a plurality of contact arms arranged between the front body and the rear body for electrically contacting, and being elastically deformed by, the conducting wire.

17. A connector for connecting to a cable having a conducting wire, the connector comprising:

a shield for receiving the cable;

a holder mounted on the shield; and a center contact arranged within the holder, at least a portion of the center contact adapted to be elastically deformed in a radially outward direction relative to a central axis thereof by the conducting wire as the conducting wire is inserted into the center contact, the center contact including:

a front body and a rear body disposed inside the holder and spaced apart from the conducting wire, the rear body adapted to receive the conducting wire therein in an insertion direction; and a plurality of contact arms arranged between the front body and the rear body being electrically contacted by, and being elastically deformed by, the conducting wire, wherein each of the plurality of contact arms includes:

an arm body for contacting the conducting wire and having a shape that is spaced further apart from the central axis of the connector in the radial outward direction proximate the rear body and nearer to the central axis proximate the front body; and an arm head connecting the arm body to at least one of the front body or the rear body.

18. The connector of claim 17, wherein the arm head includes a pair of arm heads, one arm head of the pair of arm heads connecting the front body to the arm body, and the other arm head of the pair of arm heads connecting the rear body to the arm body.

19. A connector for connecting to a cable having a conducting wire, the connector comprising:

a shield for receiving the cable;

a holder mounted on the shield;

a center contact arranged within the holder, at least a portion of the center contact being elastically deformed by the conducting wire as the conducting wire is inserted into the center contact; and a cover adapted to be fixed to the shield, the cover including at least one projection for engaging with the cable for fixing the cover relative to the cable, the protection including a plurality of sharpened tines for penetrating an outer cover of the cable.

* * * * *